United States Patent [19]

Bates

[11] Patent Number: 5,025,720
[45] Date of Patent: Jun. 25, 1991

[54] TRI-FOLD COTTON TROMPER

[76] Inventor: Chester L. Bates, Rte. 3, P.O. Box 329-A, Halls, Ind. 38040

[21] Appl. No.: 461,102

[22] Filed: Jan. 4, 1990

[51] Int. Cl.⁵ ............................................. B30B 1/00
[52] U.S. Cl. .................................. 100/226; 100/100; 100/227; 100/228
[58] Field of Search .................... 100/100, 226-228

[56] References Cited

U.S. PATENT DOCUMENTS

| | | | |
|---|---|---|---|
| 3,759,171 | 9/1973 | Vocker et al. | 100/100 |
| 3,797,382 | 3/1974 | Muzzi et al. | 100/100 |
| 4,567,821 | 2/1986 | McDonald | 100/100 |
| 4,716,825 | 1/1988 | Lemmond | 100/100 |

Primary Examiner—Jimmy G. Foster
Assistant Examiner—Thomas P. Hilliard

[57] ABSTRACT

A mechanical packing apparatus (10) for packing cotton in a cotton trailer (106) after it has been dumped there by a cotton picker comprising a tractor (12) mounted and hydraulic powered apparatus. The cotton packing apparatus (10) contains a movable packer foot (84) which minimizes the repositioning of the tractor (12) during the packing process. The cotton packing apparatus (10) also is retractable for storage on the tractor (12) when not in use.

7 Claims, 4 Drawing Sheets

TRI-FOLD COTTON TROMPER

BACKGROUND—FIELD OF INVENTION

This invention relates generally to material handling devices and specifically to tractor-mounted material handling machinery that will pack cotton in a trailer after it has been dumped there by a cotton picker, and is retractable for storage on the tractor when not in use.

BACKGROUND—DESCRIPTION OF PRIOR ART

Historically it has been the custom to dump cotton in trailers after it has been harvested by cotton pickers. Cotton, being a fluffy material, will not fill a trailer to its rated capacity without some means of packing. If cotton is not packed in the trailer, more trips to the gin will be required. Extra trailers may be required when cotton is not packed to fill the trailer to its rated capacity. Farmers typically try to avoid unnecessary expense and delay in harvest, because cotton fibers deteriorate with time due to rain, dust, etc.

Previously, farmers used manpower to pack cotton in trailers to avoid extra trips to the cotton gin. After each basket of cotton was dumped into the trailer a person would tromp around on the top of the cotton in order to pack it. This method was labor-intensive, difficult, and marginally successful. The trend in recent years toward larger cotton trailers and fewer farm laborers has created the need for mechanical cotton trompers.

At least one attempt has been made to provide a tractor side mounted, mechanical means, of packing cotton in trailers. The machine consists of a vertical mast mounted to the side frame of a tractor. A pivotal horizontal boom is attached to the top of the vertical mast. The horizontal boom projects from the vertical mast to a position over the cotton trailer. The boom is raised and lowered by a hydraulic cylinder mounted on the vertical mast and connected to one end of the horizontal boom. A vertical leg is welded to the horizontal boom at the opposite end which extends over the cotton trailer. A rectangular shaped foot is attached to the lower end of the leg. The foot is used to pack the cotton when the boom is lowered by the hydraulic cylinder. The drawback to this type of machine is that the tractor on which it is mounted has to be repositioned after every packing stroke is made. Many cotton trailers are approximately 30' long, 8' wide, and 10' deep; therefore, the tractor has to be repositioned many times to accomplish its task. Another problem is the stiff welded joint at the connection of the horizontal boom and the leg. This makes the packer foot strike the cotton at an angle pushing the cotton toward the side of the trailer rather than straight down. The projection of the boom and packer assembly out from the tractor presents another problem when the tractor is moved from field to field or farm headquarters to the field. It is difficult to maneuver through gates, down narrow roads and into parking garages with the machine on the tractor. The tractor on which the machine is attached is limited to basically one task during cotton harvest as the machine is not designed to retract during nonuse time.

Several patents have been issued on this type of compaction equipment. Examples include U.S. Pat. No. 3,579,171 to Vocker, U.S. Pat. No. 3,797,382 to Muzzi, and U.S. Pat. No. 4,716,825 to Lemmond.

In the patent to Vocker, a compactor is provided which is mounted on the front of a tractor. It consists of a mounting frame with a large bulky pivotal boom that extends over the cotton trailer. A pivotal packer foot extends downward from the end of the boom.

The size and location of this apparatus makes it difficult for the operator to see his work. The height of frame members will limit the downward stroke, therefore this machine may not fill a trailer to its rated capacity. Vocker's patent does not provide the advantage of a vertical compacting stroke. Uneven compaction and damage to the walls of the trailer would be the result unless extreme precautions are used.

The tractor must be repositioned after each packing stroke. The tractor is also positioned perpendicular to the cotton trailer, therefore a lot of space around the trailer will be required. This required space is not ordinarily available as trailers are customarily parked at the end of the rows. This leaves only enough space to maneuver a tractor parallel to the trailer. If the tractor is turned perpendicular to the trailer, it will usually be in a position to damage the unharvested rows of cotton.

It would be very difficult to use the tractor for any other task with the compactor mounted. The operator would have difficulty seeing directly in front, therefore the long extended boom could hit trees, fences, etc., unless extreme caution is used in the operation.

In the patent to Muzzi, a tamping apparatus is provided consisting of a vertical support frame, a pivoting arm with stabilizer, an extension arm, and a plate unit. This machine is connected to and supported by the three point hitch mechanism of the tractor.

It is very difficult for the operator to view the work as the tractor operation platform and seat is positioned to face the operator away from tasks such as this. When the operator turns around to face the work he must look through the structure, therefore, his view is difficult and limited.

The plate unit will strike the cotton from a vertical position if the cotton is level. However, this is seldom the case as cotton dumped from a cotton picker falls into the trailer in an irregular shape.

The three point hitch mechanism is purposely built loose and unsteady in order for an implement which is pulled behind the tractor to be able to follow the contour of the uneven ground. This unsteadiness is a disadvantage to the tromping apparatus. If the ground on which the support frame rests is not exactly even from the front to the rear of the trailer, it will be difficult to apply this machine unless leveling blocks are added to one of the support legs.

This apparatus must be moved after each packing stroke. It is positioned perpendicular to the trailer and encounters the same problems with operating room as Vocker's patent. There are hardly any other farm tasks that the tractor could be used for with this machine mounted. A farmer would be forced to use two tractors, one to do the tamping and another to pull the trailer.

In the patent to Lemmond, a compacting implement is provided consisting of a mounting frame, a vertical mast, and a pivotal ram assembly which contains a horizontally and vertically operable compaction plate.

The construction and location of this implement when mounted makes it difficult for the operator to see his work. When the compaction plate is extended downward to compact the cotton, the front of the tractor could be raised up above the ground level. This would limit the compacting ability of the apparatus if it were used with many of the lighter weight tractors.

This implement folds to avoid power lines, etc., however, a pair of guide members protrude from the front of the tractor when this is done. It would not be practical to use the tractor for other tasks for the same reasons as discussed in the patent to Vocker.

The ground on which the tractor is positioned must be even with the trailer from front to the rear or it will be difficult to position the compaction plate for a vertical stroke. This implement, being front mounted, requires extra operating space as do Vocker and Muzzi.

The patents to Vocker and Lemmond will not fit different models and sizes of tractors without modification. The result would be that if the tractor to which the unit is mounted were to break down, valuable time would be lost in refitting these two machines to another tractor.

OBJECTS AND ADVANTAGES

It is accordingly one object of the present invention to provide a cotton material handling means mountable to a tractor that is operable to pack cotton in a trailer, utilizing a movable packing foot applied in a vertical downward stroke, and is retractable for storage on the tractor.

It is another object of the present invention to provide a cotton packing means that fills a cotton trailer to its rated capacity, decreasing the required number of trips to the cotton gin.

It is a further object of the present invention to provide a mechanical means of repositioning the packing foot and thereby limit the number of times the tractor has to be repositioned.

It is another object of the present invention to provide a cotton packing means utilizing a vertical downward stroke to provide uniform density of the cotton.

It is another object of the present invention to provide a packing means that is retractable for storage on the tractor when not in use.

It is a further object of the present invention to provide a packing means that will not interfere with other tractor tasks when the packing means is in its storage position on the tractor.

It is another object of the present invention to provide a packing means that, when retracted to its storage position, will allow the tractor to be easily maneuvered through gates, down narrow roads, and into storage sheds.

These and other objects and advantages are obtained by providing a material packing means mountable to a tractor, that is operable to pack cotton in a trailer, filling it to its rated capacity, utilizing a movable packing foot which minimizes the required movement of the tractor, and is retractable, thereby increasing the usefulness and maneuverability of the tractor.

Further objects and advantages of my invention will become apparent from a consideration of the drawings and ensuing description.

Figure 1:
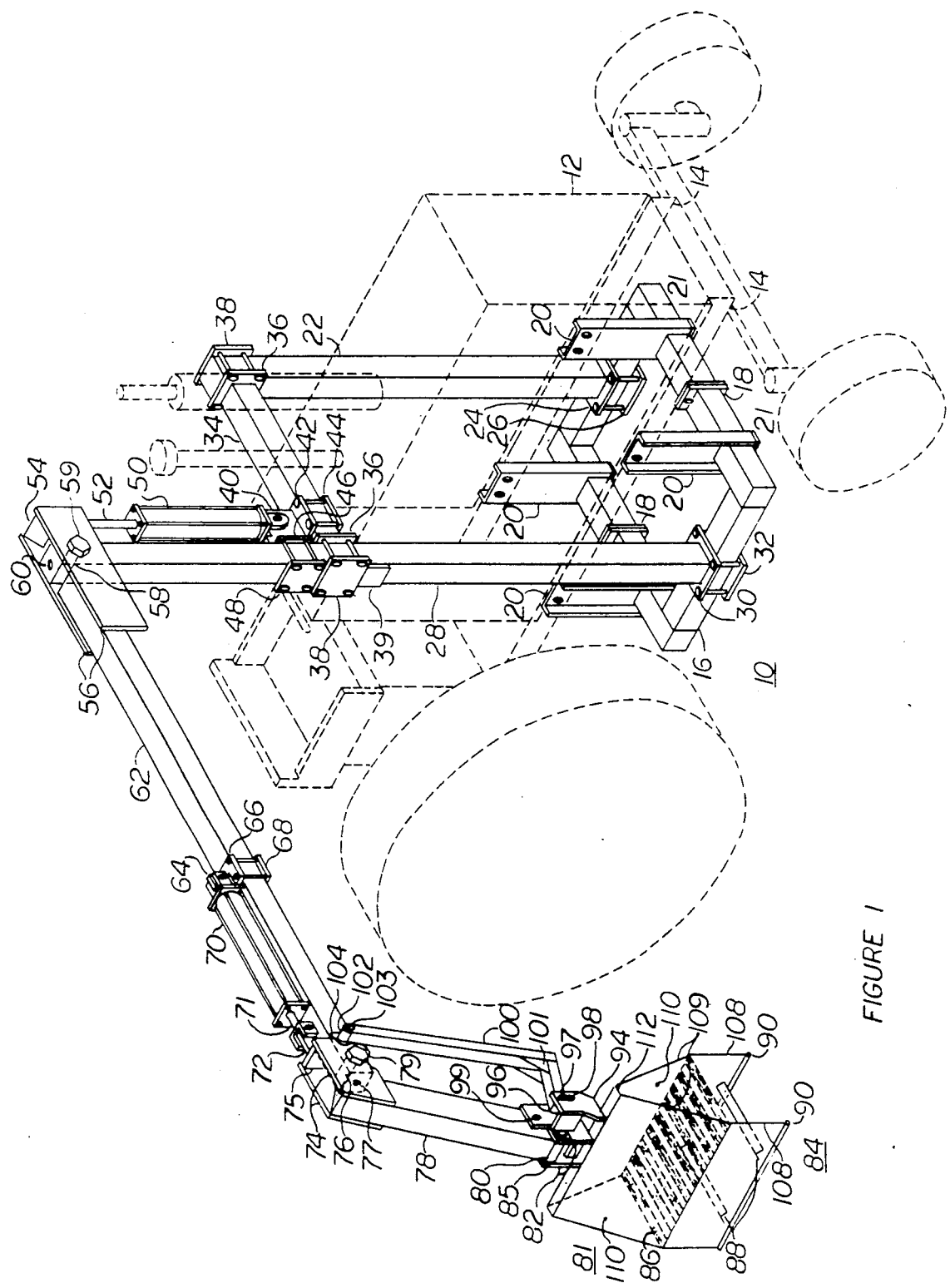
FIG. 1 is a perspective view of the invention shown in the working position. The tractor to which it is mountable is shown in the phantom lines.

| REFERENCE NUMERALS IN DRAWINGS | |
|---|---|
| 10 Cotton packing means | 68 Companion plate |
| 12 Tractor | 70 Cylinder |
| 14 Tractor side mounting frame | 71 Cylinder rod |
| | 72 Cylinder rod connector |
| 16 Main support frame | 74 Packer leg support |
| 18 Flange | 75 Transverse member |
| 20 Vertical members | 76 Bearing assembly |
| 21 Plate | 77 Access Hole |
| 22 Vertical support member | 78 Packer leg |
| 24 Plate | 79 Bolt |
| 26 Companion plate | 80 Bearing assembly |
| 28 Vertical mast | 81 Packing assembly |
| 30 Plate | 82 Packer foot connector brackets |
| 32 Companion plate | |
| 34 Horizontal bracing member | 84 Packer foot |
| | 85 Bolt |
| 36 Plate | 86 Flat support plate |
| 38 Companion plate | 88 Angle support member |
| 39 Welded plate | 90 Rod |
| 40 Cylinder support | 94 Bracket assembly |
| 42 Plate | 96 Bearing assembly |
| 44 Companion plate | 97 Pin |
| 46 Plate | 98 Pin working slot |
| 48 Companion plate | 99 Pin storage hole |
| 50 Cylinder | 100 Stablizing arm |
| 52 Cylinder rod | 101 Gusset |
| 54 Cylinder rod connector | 102 Bearing assembly |
| 56 Rectangular boom supports | 103 Shaft |
| 58 Bearing assembly | 104 Plate |
| 59 Bolt | 106 Cotton trailer |
| 60 Access hole | 108 Vertical sides |
| 62 Horizontal boom | 109 Sloping top |
| 64 Cylinder mounting block | 110 Gabled end plates |
| 66 Plate | 102 Crest |

DESCRIPTION—FIGS. 1, 2, 3, & 4

FIG. 1 shows a cotton packing means 10 mounted to a tractor 12. Cotton packing means 10 is connectable to tractor 12 at tractor side mounting frame 14 and the uppermost ends of vertical members 20 by bolts. Vertical members 20 are welded at the lower ends to main support frame 16. Vertical members 20 are spaced apart on main support frame 16 to provide the proper clearance for attachment to tractor side mounting frame 14. Plate 21 is welded to the lower end of vertical members 20 and main support frame 16 for added support strength. Main support frame 16 is made of 6 pieces of square steel tubing formed in a rectangular shape and welded at the corners as shown in FIG. 1. Main support frame 16 is made in two sections, joined by connecting flanges 18 with bolts.

Plate 24 and companion plate 26 are connected by four transverse bolts, thereby enclosing main support frame 16. A vertical support member 22 is welded at its lower end to plate 24. Vertical support member 22 is of sufficient height to support horizontal bracing member 34 at its proper location. Vertical mast 28 rest on plate 30 which is welded at its lower end. Plate 30 and companion plate 32 are connected by 4 transverse bolts thereby enclosing main support frame 16. Bolts are used to connect plate 24 and plate 26 plus plate 30 and plate 32 in order to reposition vertical support member 22, and vertical mast 28, to prevent interference between horizontal brace 34 and the muffler and air cleaner on various brands of tractors.

A plate 36 is welded at each end of horizontal bracing member 34. Plate 36 is connected by 4 transverse bolts to companion plate 38, thereby enclosing vertical mast 28 at one end and vertical support member 22 at the opposite end. The length of horizontal bracing member 34 is sufficient to provide a parallel alignment of vertical mast 28 and vertical support member 22. Plate 39 is welded to vertical mast 28 at a point immediately below plate 38 to prevent downward movement of horizontal bracing member 34.

A cylinder support 40 has plate 42 welded to its lower end. Plate 42 and companion plate 44 are connected by 4 transverse bolts thereby enclosing horizontal bracing member 34. Plate 46 is welded to the side of cylinder support 40 and is connected to companion plate 48 by 4 transverse bolts, thereby enclosing vertical mast 28. Cylinder support 40 and its attachment means is better shown in FIGS. 2, 3, and 4.

Figure 3:
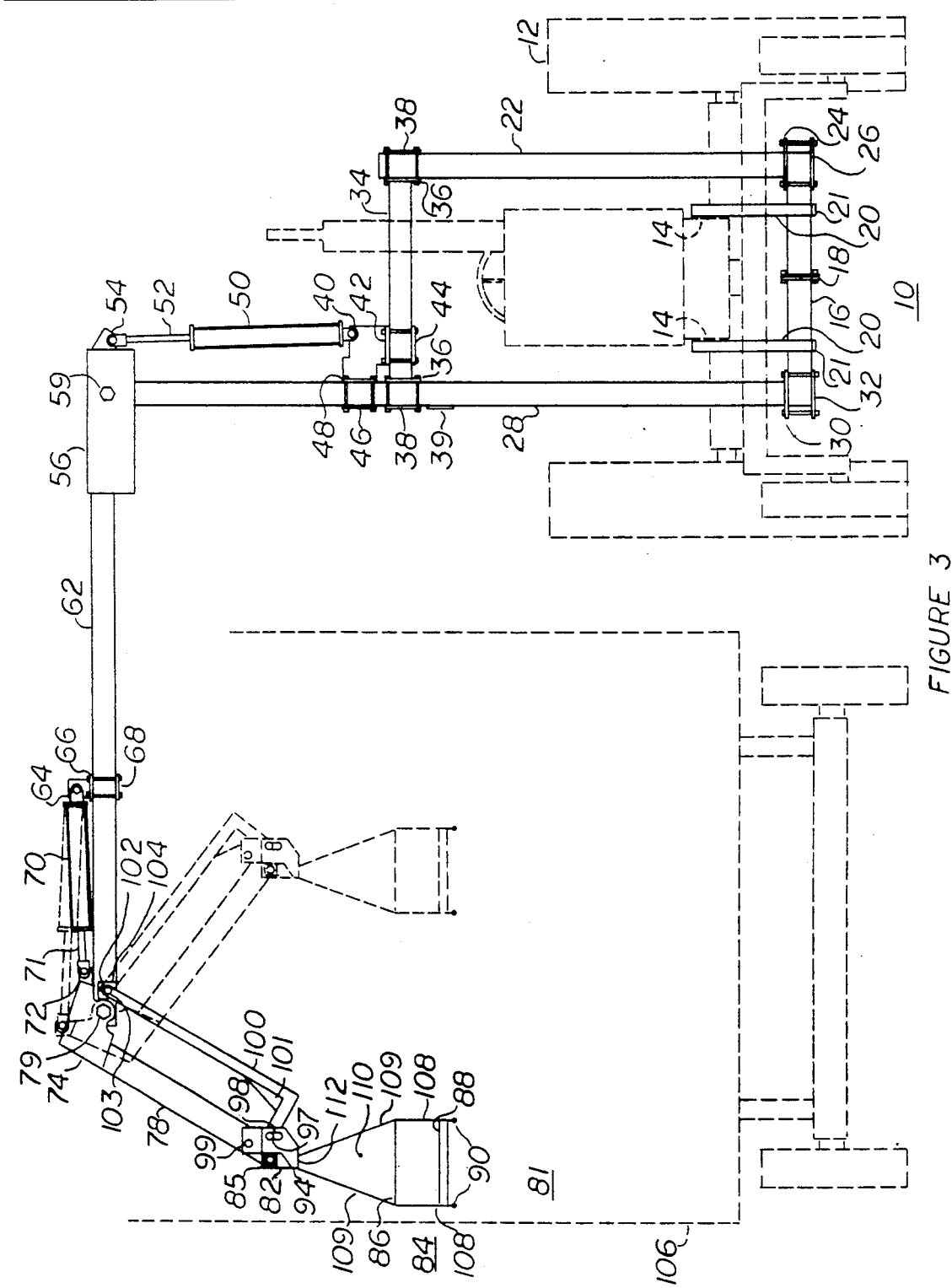
FIG. 3 is a front elevation view of the apparatus shown in the working position. Phantom lines show the movable positions of the packer foot. Phantom lines also show the cotton trailer and the tractor.
Figure 4:
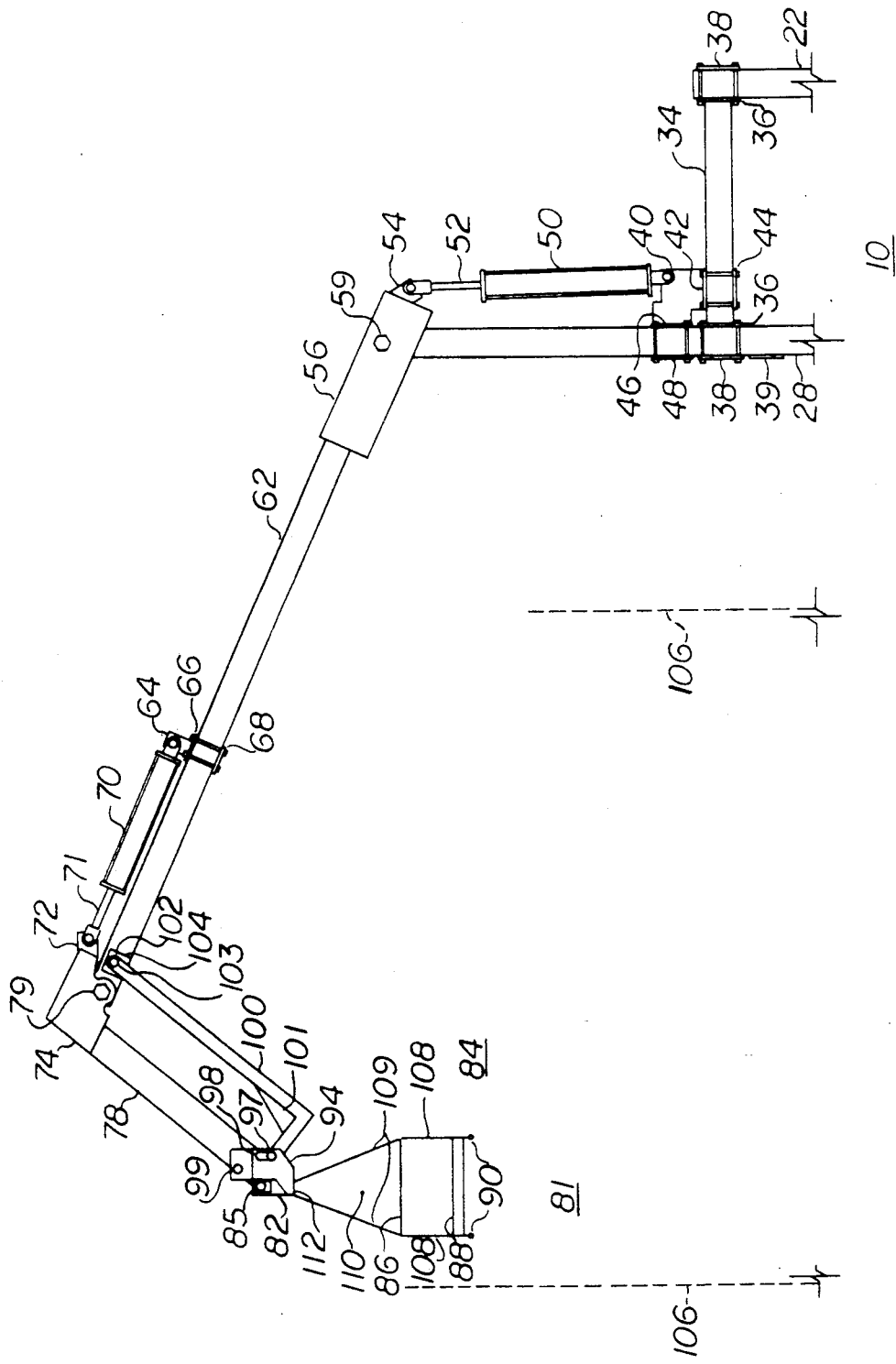
FIG. 4 is a partial front elevation view of the apparatus shown in the working position with a loaded trailer. Phantom lines show the upper portion of the trailer.

Vertical mast 28 extends upward from main support frame 16 to a height sufficient to position horizontal boom 62 over the top of cotton trailer 106. This is best shown in FIG. 3 and FIG. 4. A transverse bearing assembly 58 as shown in FIG. 1 is installed in the horizontal plane across vertical mast 28 near its uppermost end. Bearing assembly 58 is lubricated through a grease fitting which is reachable through access hole 60 at the top of vertical mast 28. A bolt 59 passing through bearing assembly 58 supports rectangular boom supports 56 and provides the pivoting means for horizontal boom 62. Shims are positioned on each side of vertical mast 28 encircling bolt 59 that passes through the bearing assembly 58. These are used to provide clearance between rectangular boom supports 56 and vertical mast 28.

A cylinder 50 is connected at its stationary end to cylinder support 40 by means of a pin. Cylinder 50 has a cylinder operating rod 52 attached to cylinder rod connector 54 by a pin. Cylinder rod connector 54 is positioned as a transverse member between two plates which are rectangular boom supports 56. Cylinder rod connector 54 is attached to rectangular boom supports 56 by welding. Cylinder rod connector 54 is installed at an angle and sufficient distance from vertical mast 28 to allow cylinder rod 52 to extend and retract fully without interference with any parts. This is best shown in FIG. 3, and FIG. 4.

Figure 2:
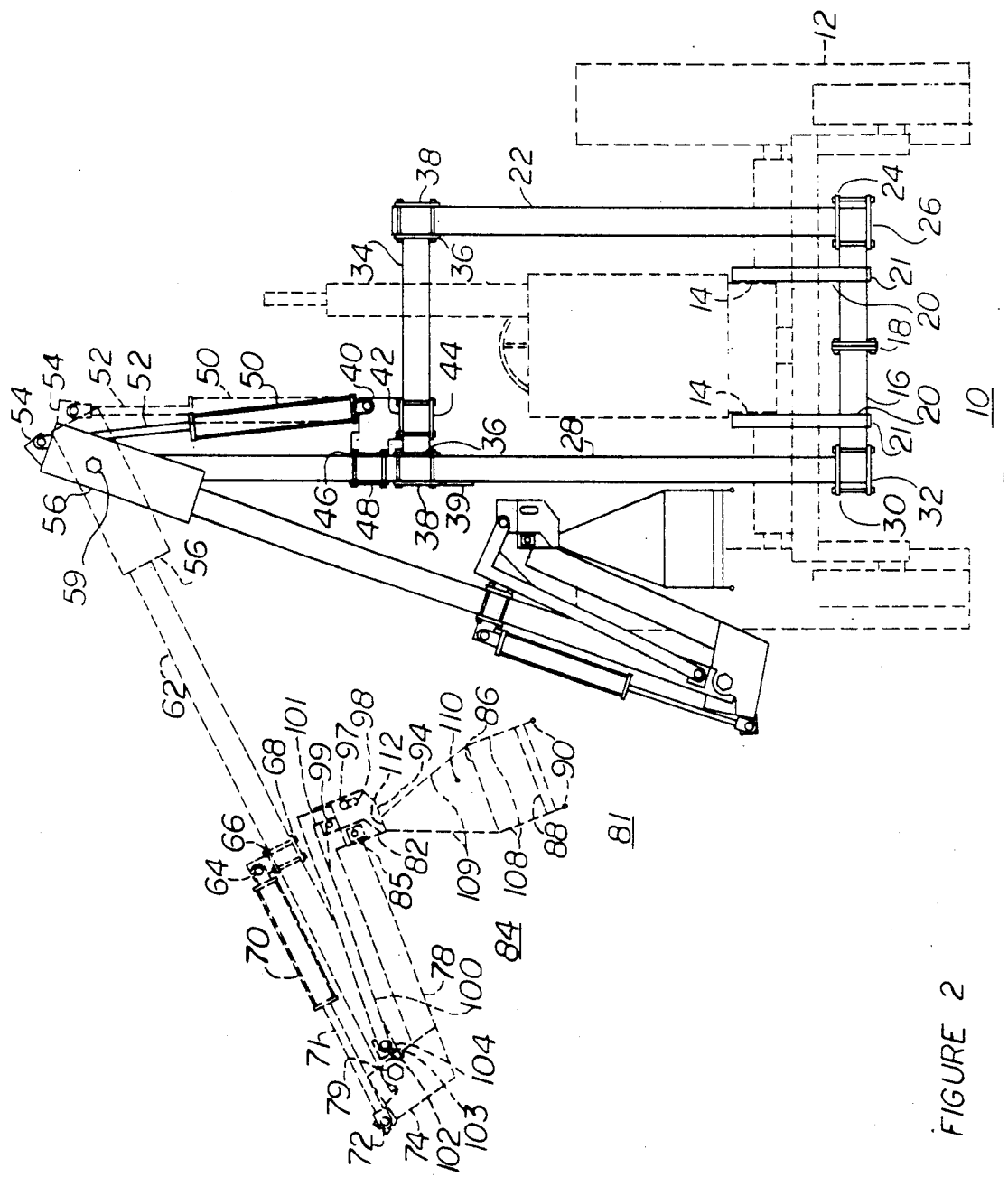
FIG. 2 is a front elevation view of the apparatus shown in the retracted storage position. Phantom lines show the apparatus as it is being prepared for working. The tractor is shown in phantom lines.

Horizontal boom 62 is supported by welding to rectangular boom supports 56. Horizontal boom 62 is of sufficient length to extend to approximately the center of cotton trailer 106. Transverse bearing assembly 76 shown in FIG. 1 is installed in the horizontal plane across horizontal boom 62 near the extended end. Bearing assembly 76 is lubricated by a grease fitting which is reachable through access hole 77. A hydraulic cylinder 70 is supported at its stationary end by a cylinder mounting block 64. Cylinder mounting block 64 is welded to plate 66. Plate 66 is connected to companion plate 68 by 4 transverse bolts thereby enclosing horizontal boom 62. Hydraulic cylinder 70 has a cylinder rod 71 which is connected to a cylinder rod connector 72. Cylinder rod connector 72 is welded to transverse member 75 as shown in FIG. 1. Transverse member 75 is connected by welding on either side to packer leg supports 74. Packer leg supports 74 are welded at the opposite end to a packer leg 78. Packer leg supports 74 pivot about and are supported by bolt 79 which passes through packer leg support 74 and bearing assembly 76. Shims are placed on either side of horizontal boom 62 and encircle bolt 79 to provide clearance between packer leg support 74 and horizontal boom 62. Packer leg supports 74 are cut at an angle at their outermost ends. This is best shown in FIG. 2, 3, and 4. This allows packing assembly 81 to be extended further across cotton trailer 106.

A bearing assembly 80 as shown in FIG. 1 with grease fitting is welded to the lower end and outermost corner of packer lag 78. Packer foot connector brackets 82 are supported at their upper ends by bolt 85 which passes through bearing assembly 80.

Shims are placed on either side of bearing assembly 80 and encircle bolt 85 to provide clearance for pivoting packer foot connector bracket 82. Packer foot connector brackets 82 are welded at their lower end to a packer foot 84. Packer foot 84 is made of metal plates. Packer foot 84 is fashioned generally in the shape of a barn. A rod 90 is welded along the lower edge of vertical sides 108. Vertical sides 108 are welded along their upper edge to sloping top 109. Added strength is provided by transverse flat support plates 86 and transverse angle support member 88 connecting vertical sides 108. Sloping top 109 is welded at each end to plates which form gable end plates 110. A crest 112 at the top of packer foot 84 is welded to sloping top 109, packer foot connector brackets 82, and gable end plates 110.

A stabilizing arm 100 is "L" shaped and contains gusset 101, installed at the intersection of the vertical and horizontal sections for added strength. Stabilizing arm 100 is of sufficient vertical and horizontal length and is positioned to maintain packing foot assembly 81 in a vertical position as packer leg 78 is pivoted back and forth. This is best shown in FIG. 3, and 4. Bearing assembly 102 located at the uppermost end of arm 100, pivots about shaft 103. Shaft 103 is welded on one end to plate 104. Plate 104 is welded to horizontal boom 62 at the same centerline height as bolt 79. Bearing assembly 96 at the lower end of stabilizing arm 100 pivots about pin 97. Pin 97 passes through pin working slot 98 in bracket assembly 94 and bearing assembly 96.

When packing means 12 is in its storage position, pin 97 is removed from pin working slot 98 in bracket assembly 94 and reinserted in pin storage hole 99. This is best shown in FIG. 2. Bracket assembly 94 is made in a "U" shape and pin working slot 98 and pin storage hole 99 are positioned at the proper vertical and horizontal distance apart. Bracket assembly 94 is welded on one side to one packer foot connector bracket 82 at its uppermost end. Further support is provided to bracket assembly 94 by welding on the opposite side to crest 112.

FIGS. 2, 3, & 4 OPERATION

In operation cotton packing means 10 is connected to tractor 12 by bolts which connect tractor side mounting frame 14 to vertical members 20. It should be pointed out also that cotton packing means 10 is usually disassembled at flanges 18 on main support frame 16, and plate 36 and companion plate 38 which enclose vertical support member 22. These points are reconnected once the bolts have been fastened at tractor side mounting frame 14 and vertical members 20.

Once cotton packing means 10 has been mounted to tractor 12, the hydraulic hoses from cylinders 50 and 70 are connected to hydraulic outlets on tractor 12. The operator then retracts cylinder rod 52 which causes horizontal boom 62 to pivot about bearing assembly 58, thereby moving packing assembly 81 a short distance from tractor 12. The operator changes the location of pin 97 from pin storage hole 99 to pin working slot 98. This is best shown in FIG. 2 by the phantom lines.

The operator then raises horizontal boom 62 and packing assembly 81 by further retraction of cylinder rod 52 to a height sufficient to clear the sides of the cotton trailer 106. This is best shown in FIG. 3. The operator positions tractor 12 parallel to cotton trailer 106 thereby extending horizontal boom 62 over approximately the middle of cotton trailer 106. Packer leg 78 and packing assembly 81 are rotated about bearing assembly 76 when the operator retracts cylinder rod 71 on cylinder 70. When cylinder rod 71 is retracted fully, packing assembly 81 will be at its further most distance from tractor 12. Stabilizing arm 100 maintains packing foot assembly 81 at approximately 90 degrees from the bottom of cotton trailer 106. This is accomplished by stabilizing arm 100 rotating about shaft 103 which passes through bearing assembly 102 at the uppermost end. Stabilizing arm 100 also rotates about pin 97 which passes through bearing assembly 96 at the lower end. The operation of stabilizing arm 100 is shown in FIG. 2, 3, and 4.

The operator extends cylinder rod 52 which pivots horizontal boom 62 and lowers packing assembly 81 until packer foot 84 contacts the cotton. Due to the irregular shape of the loose cotton pile and the inherent flexibility created by slot 98, packer foot 84 may not be level at this point. The operator adjusts the position of packer leg 78 by extending or retracting cylinder rod 71 in order to obtain a near vertical position of packer foot 84. Stabilizing arm 100 assists in maintaining packer foot 84 in a vertical position. The operator extends cylinder rod 52 further which causes packer foot 84 to compress the cotton pile. Cylinder rod 52 is then retracted a sufficient distance to raise packer foot 84 above the cotton. The operator extends or retracts cylinder rod 71 to reposition packer foot 84 for a packing stroke in a new location. Horizontal boom 62 is again positioned to lower packing assembly 81 to the new point of contact. Cylinder rod 71 is again extended or retracted as necessary to maintain packer foot 84 in a vertical position. Horizontal boom 62 is then lowered thereby causing packer foot 84 to compress cotton at this new location.

Once the cotton has been packed across the full width of trailer 106 at the starting point, tractor 12 is moved forward or backward while parallel to trailer 106 to begin packing at a new place.

When trailer 106 is nearly filled packer foot 84 will be working approximately 12'–14'above the ground level. The use of pin working slot 98 instead of a round hole allows packer foot 84 to continue to pack the cotton from a vertical position. This is best shown in FIG. 4. The operation of packing means 10 is the same as described previously.

Once trailer 106 is fully packed, tractor 12 is moved away from trailer 106 and cylinder rod 71 is fully extended. Cylinder rod 52 is also extended to a point which lowers packing assembly 81 to a height which lets the operator remove pin 97 from pin working slot 98 and reposition it to pin storage hole 99. Cylinder rod 52 is then extended fully thereby moving packing assembly 81 to its storage position on tractor 12.

Accordingly it can be seen by the reader that the cotton packing means will pack cotton in a cotton trailer using a vertical downward stroke with a minimum amount of effort by the operator. It will also require a minimum amount of tractor repositioning to accomplish its task. It will be evident that the cotton packing means will retract for storage on the tractor, allowing it to be used for other purposes.

Although the description above contains many specifities, these should not be construed as limiting the scope of the invention, but merely providing illustrations of the presently preferred embodiment of this invention. Many other variations are possible. Accordingly the scope of the invention should be determined not by the embodiments illustrated, but by the appended claims and their legal equivalents.

Having thus described the invention what is claimed is:

1. In a cotton packing means mountable to a tractor and operable to pack cotton in a trailer after it has been dumped there by a cotton picker, the combination comprising:

(A) a rectangular main support frame positioned between said tractor front and rear wheels in a horizontal plane underneath said tractor motor, said main support frame being extended beyond both sides of said tractor motor the length required to support a vertical mast and vertical support member, (B) a plurality of vertical mounting members connected at their lower ends to said main support frame and having mounting means at their upper ends for connection to a plurality of side mounting frames of said tractor, said side mounting frames being located adjacent to and on either side of said tractor motor, (C) a vertical mast with a connected flat support plate resting on, and adjustably connected to, one extended end of said main support frame, (D) a vertical support member with a connected flat support plate resting on, and adjustably connected to, an opposite extended end of said main support frame, (E) a horizontal bracing member positioned in a horizontal plane above said tractor motor, said bracing members being adjustably connected, one end to said vertical support member at a position near the top end of said vertical support member, and another end of said bracing member to said vertical mast at a point along the vertical length of said vertical mast sufficient to clear said tractor's hood, (F) a cantilevered horizontal boom with pivoting means, said boom being connected to the top end of said vertical mast, said pivoting means being located toward one end of said horizontal boom, whereby sufficient length is available beyond the pivot point for the connection and operation of a hydraulic cylinder, the other end of said cylinder being connected to a cylinder support located on said horizontal bracing member, said horizontal boom being positioned atop said vertical mast in a direction such that the extended length of said horizontal boom is perpendicular to the path of travel of said tractor, (G) a packer leg located at said extended end of said horizontal boom and being connected to said horizontal boom by a pivoting means, said packer leg being positioned with its top end connected to said pivoting means at an obtuse angle, said pivoting means being further connected to the movable end of a second hydraulic cylinder, said second hydraulic cylinder being connected at its other end to a cylinder mounting block located on top of said horizontal boom, whereby through the action of said second hydraulic cylinder, the lower end of said packer leg can be made to swing in an arc, (H) a packer foot located at the lower end of said packer leg, said packer foot being connected to said packer leg by a pivoting means, said packer foot being fashioned generally in the shape of a barn with said pivotal connecting means located at the center of the ridge line of said packer foot roof, said packer foot roof also being the location of a stabilizer arm bracket assembly, said bracket assembly being located along said ridge line and immediately adjacent to said packer foot and said packer leg pivotal connecting means, (I) an L-shaped stabilizing arm with bearing assemblies at each end, the horizontal end of said stablizing arm being connected to a pivot point on said stabilizer arm bracket assembly which in turn is located on said packer foot, and the vertical end of said stabilizing arm being connected to a shaft with pivoting means which extends in a horizontal plane from the side of said horizontal boom at a point which will cooperate with said pivot point between said horizontal boom and said packer leg, and said pivot point between said packer leg and said packer foot, whereby said packer foot is maintained in a vertical position as the lower end of said packer leg swings in an arc.

2. A cotton packing means according to claim 1, further including repositioning means provided at said support plate of said vertical mast and said vertical support member, said repositioning means being provided for either forward or backward movement of said vertical mast and said vertical support members along the length of the portions of said main support frame which are parallel with the path of travel of said tractor, whereby said horizontal bracing member being located above said tractor hood may be relocated to maintain a clearance from mufflers and other items which project vertically from said tractor hood.

3. A cotton packing means according to claim 1 wherein said horizontal boom with said packer leg, and said packer foot with cooperating stabilizer arm project outward from said tractor perpendicular to the path of travel, said projection point being located between the front and rear wheels of said tractor, said projection point being further located at the top of said vertical mast, whereby the operator of said tractor being positioned on the standard operation platform of said tractor is able to view the work of said cotton packing means without obstruction.

4. A cotton packing means according to claim 1 wherein projection of said cantilevered horizontal boom perpendicular to the path of travel of said tractor, together with the pivotal capability of said packer leg and said packer foot, in cooperation with said stabilizing arm, allows said tractor to travel immediately adjacent and parallel to the long side of said trailer, the arrangement allowing said packing means to work at any point across the width of said trailer as said tractor is moved from end to end of said trailer, whereby required operating space is minimized and said packing process is accomplished with simple forward movement of said tractor.

5. A cotton packing means according to claim 1 wherein projection of said packing means is perpendicular to the path of travel of said tractor, the projection point being located between said front and rear wheels of said tractor, together with the pivotal capability of said horizontal boom, said packer leg, and said packer foot, in cooperation with said stabilizing arm, allows said packing assembly to be folded to a point where the operator must reposition said pivot point between said stabilizer arm bracket located on said packer foot, and said L-shaped stabilizer arm horizontal end, to a storage position pivot point, the new location allowing said packing assembly to retract to a point between said front and rear wheels of said tractor, whereby said tractor may be used for other farm tasks.

6. A cotton packing means according to claim 1 wherein said packing means, being supported by said tractor from a point between said front and rear wheels of said tractor, and with projection and working arrangement perpendicular to the path of travel of said tractor, is able to utilize as a counterbalance weight during the packing process, that portions of the weight of said tractor which is present on the side where said packing means is located, said weight encompassing all weight of said tractor from front to rear from a vertical plane centerline point to the outermost limits of said tractor.

7. A cotton packing means according to claim 1 wherein said packer foot is able to complete a vertical downward stroke, regardless of the difference in angle between said packer foot contact surface and said cotton pile irregular shape at the point of contact, said packer foot being maintained in a vertical attitude through cooperation of said second hydraulic cylinder and said L-shaped stabilizing arm, said second hydraulic cylinder being able to reposition said packer foot from side to side of said cotton trailer during said packing process through pivot points at said upper and lower ends of said packer leg, said lower end of said packer leg being pivotally connected to said packer foot, while said L-shaped stabilizing arm acts as a stabilizing force to hold said packer foot vertical, said L-shaped stabilizing arm being connected by pivoting means to said packer foot bracket and said horizontal boom.

* * * * *